(12) United States Patent
Reed, Jr. et al.

(10) Patent No.: US 11,787,570 B2
(45) Date of Patent: Oct. 17, 2023

(54) MULTI-PART MARMAN BAND CLAMP WITH RETAINER

(71) Applicant: Raytheon Company, Waltham, MA (US)

(72) Inventors: Billy B. Reed, Jr., Tucson, AZ (US); Mark J. Kocan, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 589 days.

(21) Appl. No.: 16/986,351

(22) Filed: Aug. 6, 2020

(65) Prior Publication Data

US 2022/0041305 A1   Feb. 10, 2022

(51) Int. Cl.
*B64G 1/64* (2006.01)
*F16B 2/06* (2006.01)

(52) U.S. Cl.
CPC ............ *B64G 1/641* (2013.01); *B64G 1/645* (2013.01); *F16B 2/065* (2013.01)

(58) Field of Classification Search
CPC ......... B64G 1/641; B64G 1/645; F16B 2/065; F16B 31/005; F42B 15/38; Y10S 403/03; Y10T 403/11; Y10T 403/7062
See application file for complete search history.

(56) References Cited

U.S. PATENT DOCUMENTS

| 3,109,216 | A | * | 11/1963 | Brown | F16B 31/005 411/441 |
| 3,237,521 | A | * | 3/1966 | Francis | F16B 31/005 411/440 |
| 5,402,728 | A | * | 4/1995 | Garner | B64G 1/645 411/19 |
| 6,712,542 | B2 | * | 3/2004 | Buder | B64G 1/641 244/173.1 |
| 9,732,776 | B2 | | 8/2017 | Madsen | |
| 10,773,835 | B2 | * | 9/2020 | Cosner | B64G 1/641 |
| 10,989,243 | B2 | * | 4/2021 | Thomas | F16B 31/005 |

FOREIGN PATENT DOCUMENTS

CN   102767996 A   * 11/2012   ............ B64G 1/641

* cited by examiner

*Primary Examiner* — Josh Skroupa
(74) *Attorney, Agent, or Firm* — Renner, Otto, Boisselle, & Sklar

(57) ABSTRACT

A Marman band clamp has multiple parts, such as two halves, that together make up a ring. The halves are joined by diametrically opposed mechanical connections, one of which is a mechanical release separably mechanically coupled ends of the parts (halves). The mechanical release may include an explosive bolt that is used to release the ends of the halves. The mechanical release may capture portions of the release at the ends of the ring halves after severing of the explosive bolt. A nut may be retained by an end of one of the halves by use of a retainer fastener, such as a pin, to prevent the nut from separating from the ring half end when the bolt is severed. This helps retain the pressurized gases between the severed part of the bolt longer, better using the energy from the pressurized gases to reliably separate the ends of the halves.

13 Claims, 3 Drawing Sheets

MULTI-PART MARMAN BAND CLAMP WITH RETAINER

GOVERNMENT RIGHTS STATEMENT

This invention was made with government support under government contract N00024-19-C-5412 awarded by the United States Naval Sea Systems Command. The government has certain rights in the invention.

FIELD OF THE INVENTION

The invention is in the field of Marman band clamps and methods of releasing such clamps.

DESCRIPTION OF THE RELATED ART

Marman clamps are commonly used in space vehicles to connect satellite payloads to rockets, join rocket stages and antennas, and as a general clamping mechanism. A Marman clamp is a band clamp that allows two cylindrical interfaces to be clamped together.

Single-piece Marman clamps can be difficult to manufacture and install. Much of the preload is consumed overcoming the clamp spring force resulting a less stiff/more compliant joint. Two-piece Marman clamps, while simpler to manufacture, can present problems in design and installation by virtue of a lack of the built-in spring force of the traditional (yet more complicated) one-piece Marman clamps, where the built-in spring force easily spreads the Marman clamp apart when activated.

SUMMARY OF THE INVENTION

According to an aspect of the invention, a Marman clamp system includes: a ring including multiple parts; and a mechanical release separably mechanically coupling ends of two of the parts; wherein the mechanical release facilitates capturing separated portions of the mechanical release to the two of the parts, to aid in separating the ends of the two of the parts.

According to an embodiment of any paragraph(s) of this summary, the multiple parts are two ring parts coupled together at opposite ends.

According to an embodiment of any paragraph(s) of this summary, the multiple parts are two semicircular ring halves.

According to an embodiment of any paragraph(s) of this summary, first ends of the ring halves are separably coupled by the mechanical release; and further comprising a mechanical connection mechanically coupling together second ends of the ring halves, where the second ends are at opposite ends of the ring halves from the first ends.

According to an embodiment of any paragraph(s) of this summary, the mechanical connection includes a bolt that engages a nut to hold the second ends together.

According to an embodiment of any paragraph(s) of this summary, the mechanical release includes an explosive bolt that has a bolt shaft that extends from a head of the explosive bolt, and a nut that threadedly engages the bolt shaft of the explosive bolt.

According to an embodiment of any paragraph(s) of this summary, the mechanical release includes a capture fastener that retains the nut of the mechanical release to one of the ring halves, after detonation of the explosive bolt.

According to an embodiment of any paragraph(s) of this summary, the capture fastener is attached to the first end of the one of the ring halves.

According to an embodiment of any paragraph(s) of this summary, the capture fastener is a pin.

According to an embodiment of any paragraph(s) of this summary, the capture fastener retains a portion of the bolt shaft along with the nut of the mechanical release.

According to an embodiment of any paragraph(s) of this summary, the head of the explosive bolt is retained by another the ring halves, after detonation of the explosive bolt.

According to an embodiment of any paragraph(s) of this summary, another portion of the bolt shaft remains attached to the head after detonation of the explosive bolt.

According to an embodiment of any paragraph(s) of this summary, deformation of the another portion of the bolt shaft couples the head and the another portion of the bolt shaft to the another of the ring halves, after detonation of the explosive bolt.

According to an embodiment of any paragraph(s) of this summary, one or more parts of the clamp system are made of steel.

According to another aspect, a Marman clamp includes: a ring including two semicircular ring halves; a mechanical release separably mechanically coupling first ends of the ring halves; and a mechanical connection mechanically coupling together second ends of the ring halves, where the second ends are at opposite ends of the ring halves from the first ends; wherein the mechanical release includes a retainer pin at one of the first ends of the ring halves, where the retainer pin facilitates capturing separated portions of the mechanical release to the two of the parts, to aid in separating the ends of the two of the parts.

According to an embodiment of any paragraph(s) of this summary, the mechanical release includes an explosive bolt.

According to another aspect, a method of disengaging a Marman clamp includes the steps of: detonating an explosive bolt of a mechanical release that couples together ends of clamp parts of the Marman clamp; retaining respective portions of the mechanical release to the ends of the clamp parts after the detonation of the explosive bolt; and separating the ends of the clamp parts, with the portions of the mechanical release retained to the ends of the clamp parts.

According to an embodiment of any paragraph(s) of this summary, the retaining includes using a retaining fastener to retain one of the portions of the mechanical release to one of the ends of the clamp parts.

According to an embodiment of any paragraph(s) of this summary, the retaining aids in using gases produced by the detonation in separating the ends.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

According to a general embodiment, a Marman band clamp has multiple parts, such as two halves, that together make up a ring. The halves are joined by diametrically opposed mechanical connections, one of which is a mechanical release separably mechanically coupled ends of the parts (halves). The mechanical release may include an explosive bolt that is used to release the ends of the halves. The mechanical release may capture portions of the release at the ends of the ring halves after severing of the explosive bolt. For example a nut may be retained by an end of one of the halves by use of a retainer fastener, such as a pin, to prevent the nut from separating from the ring half end when the bolt is severed. This helps retain the pressurized gases between the severed part of the bolt longer, better using the energy from the pressurized gases to reliably separate the ends of the halves originally joined by the mechanical release. This may improve performance and reliability in operation of the multi-part Marman clamp.

Figure 1:
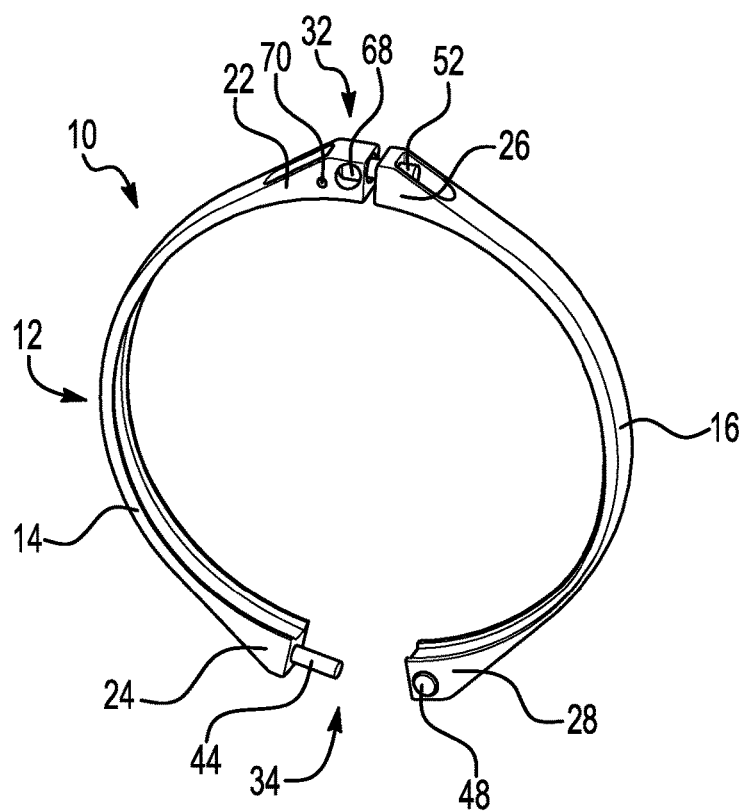
FIG. 1 shows a Marman clamp according to an embodiment of the present invention.
Figure 2:
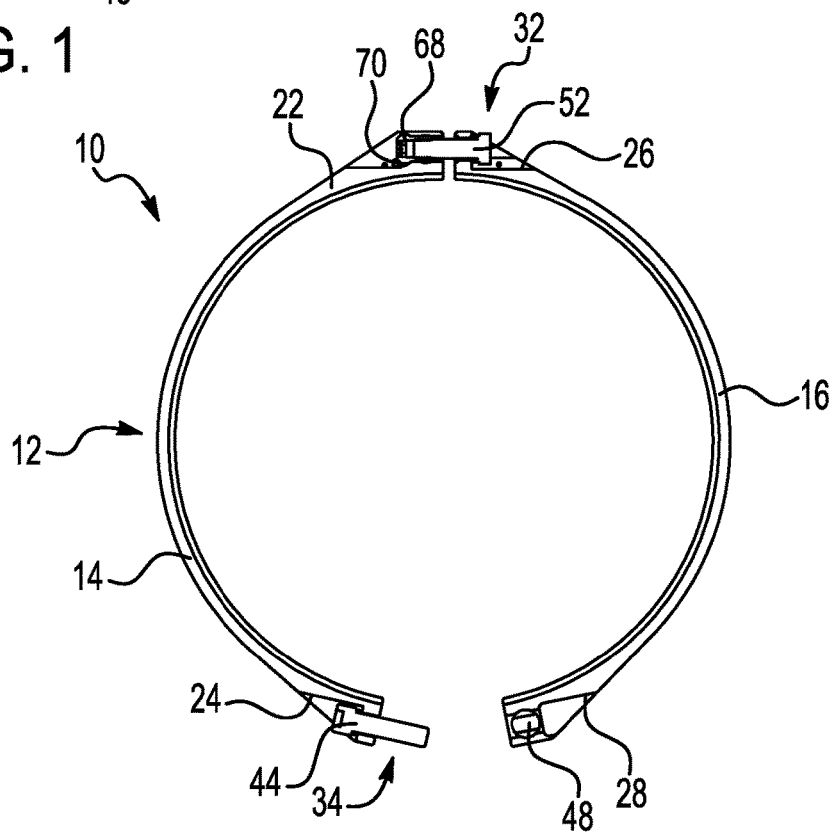
FIG. 2 is another view of the Marman clamp of FIG. 1.

FIGS. 1 and 2 show a general layout of a two-piece Marman band clamp (or clamp system) 10. A ring 12 is the main clamping device, and is made up of multiple ring parts. In the illustrated embodiment the ring 12 is composed of two ring halves 14 and 16, although it would be possible to have the ring 12 be composed of more than two parts, or of two parts with a different configuration than in the illustrated embodiment. The ring half 14 has a first end 22 and a second end 24. The ring half 16 has a first end 26 and a second end 28. The respective first ends 22 and 26 of the ring halves 14 and 16 are separably (releasably) joined together at a mechanical release 32. The respective second ends 24 and 28 of the ring halves 14 and 16 are joined together at a mechanical connection 34.

The ring halves 14 and 16 together provide the effective part of the ring 12, being used to hold together the objects (not shown) that are clamped together by the ring 12. The ring 12 may be used to clamp together any of a variety of cylindrical objects, such as stages of rockets or missiles. The parts of the ring 12, such as the ring halves 14 and 16, may have a cupped cross-sectional shape that is configured (for example) to capture elements such as flanges of the objects to be clamped together.

By making the ring 12 as multiple clamping parts, such as the ring halves 14 and 16, the ring 12 may be easier and less expensive to manufacture than one-piece Marman clamp rings. The mechanical connection 34 is used for permanently coupling together the second ends 24 and 28 of the ring halves 14 and 16. The mechanical connection 34 may include a bolt 44 that passes through holes in the ends 24 and 28, and engages a threaded nut 48. The mechanical coupling of the ends 24 and 28 is intended to be permanent, at least in the sense that the connection between the ends 24 and 28 is maintained throughout use of the clamp 10, even as the first ends 22 and 26 of the ring halves 14 and 16 separate, and the clamp 10 releases from the objects being held together. As shown in FIGS. 1 and 2, the clamp 10 is configured for installation onto objects to be held together, with the bolt 44 not yet engaged with the nut 48.

Figure 3:
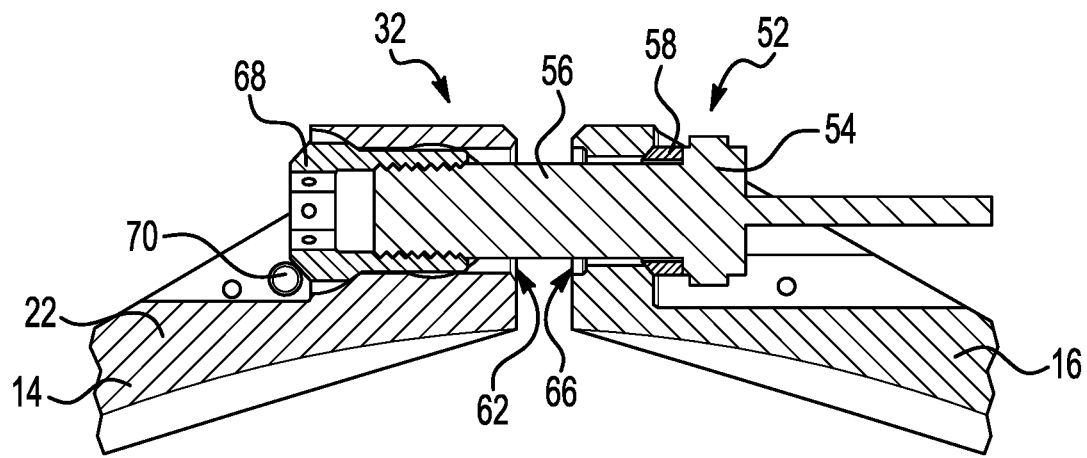
FIG. 3 is a detailed view of the mechanical release of the Marman clamp of FIG. 1.

With reference now in addition to FIG. 3, the separable mechanical release 32 includes an explosive bolt 52 that has a head 54 and a threaded body (shaft) 56. The shaft 56 passes through a spherical nut 58 and through holes 62 and 66 in the first ends 22 and 26 of the halves 14 and 16. At the opposite side of the release 32 from where the bolt head 54 is located, the bolt shaft 56 is threaded into an internally-threaded nut 68. The nut 68 is retained at the first end 22, even after the explosive bolt 52 is detonated to sever the threaded shaft 56. This is done by a capture fastener 70. In the illustrated embodiment the capture fastener 70 is a pin that protrudes from the first end 22. However the capture fastener 70 alternatively may be any of a variety of other sorts of capture devices.

Figure 4:
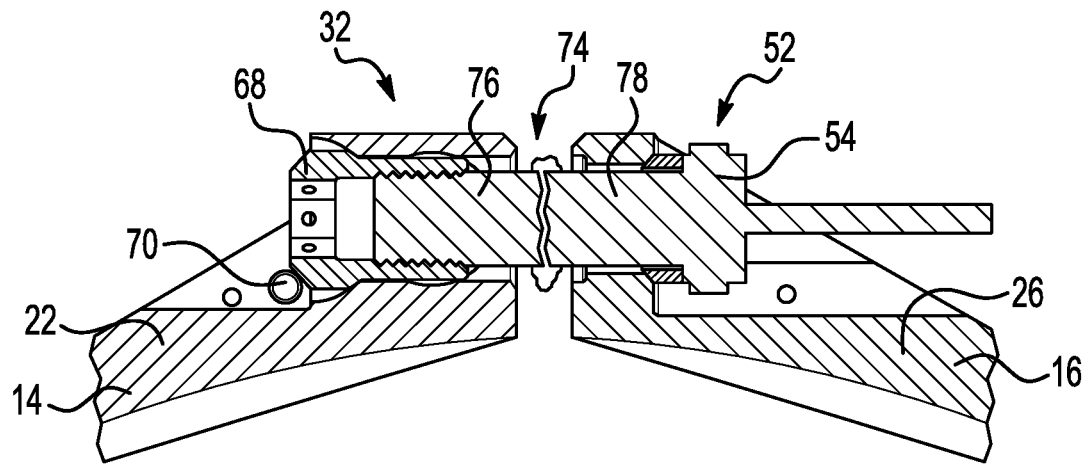
FIG. 4 shows a first step in the operation of the Marman clamp of FIG. 1.
Figure 5:
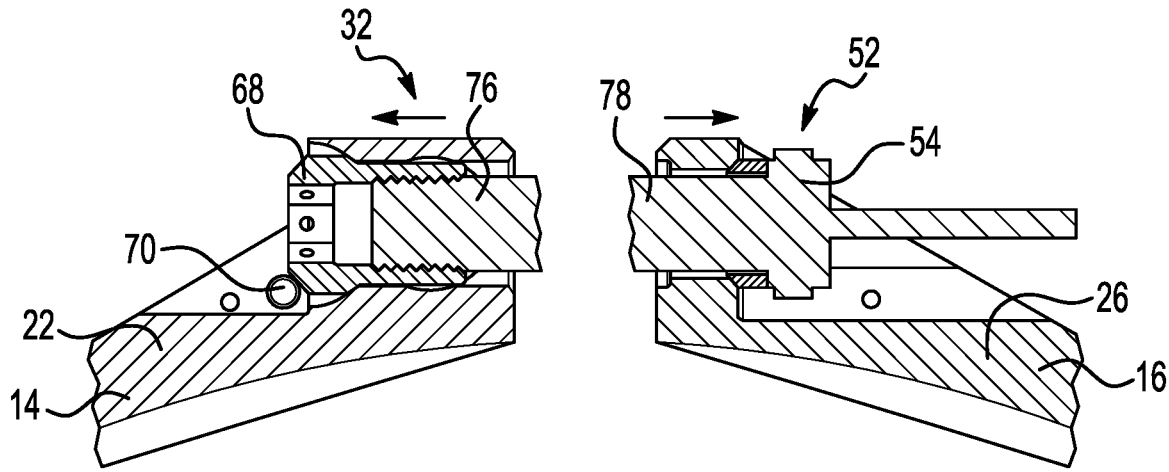
FIG. 5 shows a first step in the operation of the Marman clamp of FIG. 1.

FIGS. 4 and 5 illustrate the process of the detonation of the explosive bolt 52, and the separation of the first ends 22 and 26, resulting in the release of the clamp 10. In FIG. 4 the bolt 52 has been detonated, with separation of the bolt shaft 56 at a detonation location 74, between shaft portions 76 and 78. The shaft portion 76 remains threaded into the nut 68. The shaft portion 78 remains connected to the bolt head 54. The pressurized gases produced by the detonation push the shaft portions 76 and 78 in opposite directions, pushing them apart from each other.

With reference now to FIG. 5, the pushing apart of the shaft portions 76 and 78 is transmitted to the first ends 22 and 26 of the ring halves 14 and 16. It is desirable that this pushing force be used to aid in separation of the first ends 22 and 26, as opposed to being squandered in the movement of the separated portions of the mechanical release 32 relative to the first ends 22 and 26. To that end, the capture fastener 70 maintains the connection of the nut 68 (and the attached shaft portion 76) with the first end 22. Thus any forces on the shaft portion 76 from the pressurized gases of the detonation are transmitted to the first end 22 (through the nut 68 and the capture fastener 70). This captures the axial energy captured from the bolt fracturing pressure of the detonation of the explosive bolt 52. The continued mechanical connection between the first end and the combination of the shaft portion 76 and the nut 68, slows movement of the shaft portion 76 away from the detonation, since the force pushing on the shaft portion 76 is transmitted to a larger mass (including the end 22). This aids in containing the pressurized gases from the detonation, allowing more of the force from the detonation to be utilized to push against the severed shaft portions 76 and 78, rather than dissipated into the surroundings.

It is also advantageous to have the shaft portion 78 and the bolt head 54 retained by the first end 26 of the ring half 16. This may occur without any need for a particular structure (akin to the capture fastener 70), since the shaft portion 78 and/or the bolt head 54 may be deformed by the detonation. However, as alternative a capture fastener, such as a pin, may be used in addition to retain the bolt head 54.

The force provided by the detonation may assist the separation forces caused by the ring 12 returning to its default (unstressed shape). The configuration of the ring 12 may result in a need for less separation force from the stresses in the curved ring halves. The capture of the parts of the severed mechanical release 32 may result in the advantages of more consistent and reliable separation performance, and/or preventing poor/undesirable performance caused by rebound of the first ends 22 and 26.

The parts of the clamp 10 may be made of any of a variety of suitable materials. For example steel or another suitable metal may be used.

Figure 6:
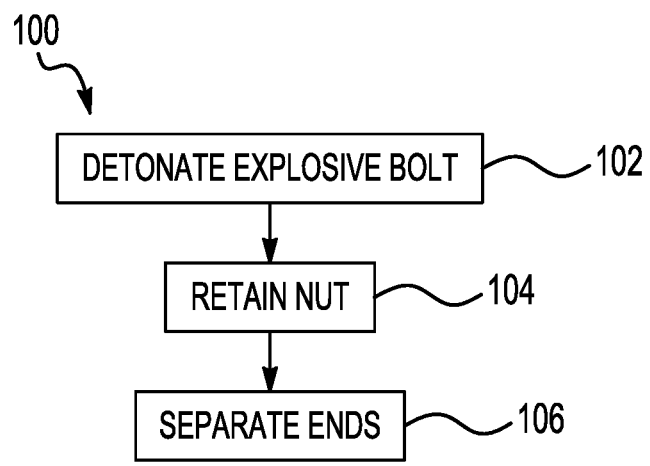
FIG. 6 is a high-level flow chart of a method of operating a Marman clamp, according to an embodiment of the invention.

FIG. 6 shows a high-level flow chart of a method 100 of using the clamp 10 (FIG. 1) to separate a pair of objects. In step 102 the explosive bolt 52 (FIG. 3) is detonated, severing the bolt shaft 56 (FIG. 3) and separating parts (portions) of the mechanical release 32. In step 104 the capture fastener 70 (FIG. 3) retains the portion of the mechanical release 32 that includes the nut 68 (FIG. 3). Finally, in step 106 the first ends 22 and 26 of the ring halves 14 and 16 separate, decoupling the objects previously held by the Marman clamp.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A Marman clamp system comprising:
   a ring including multiple parts; and
   a mechanical release separably mechanically coupling ends of two of the parts;
   wherein the mechanical release facilitates axially capturing separated portions of the mechanical release to the two of the parts, to aid in separating the ends of the two of the parts;
   wherein the multiple parts are two semicircular ring halves;
   wherein first ends of the ring halves are separably coupled by the mechanical release; and
   further comprising a mechanical connection mechanically coupling together second ends of the ring halves, where the second ends are at opposite ends of the ring halves from the first ends;
   wherein the mechanical release includes an explosive bolt that has a bolt shaft that extends from a head of the explosive bolt, and a nut that threadedly engages the bolt shaft of the explosive bolt; and
   wherein the mechanical release includes a capture fastener that axially retains the nut of the mechanical release to one of the ring halves, after detonation of the explosive bolt.

2. The system of claim 1, wherein the capture fastener is attached to the first end of the one of the ring halves.

3. The system of claim 1, wherein the capture fastener is a pin.

4. The system of claim 1, wherein the capture fastener retains a portion of the bolt shaft along with the nut of the mechanical release.

5. The system of claim 1, wherein the head of the explosive bolt is retained by another the ring halves, after detonation of the explosive bolt.

6. The system of claim 5, wherein another portion of the bolt shaft remains attached to the head after detonation of the explosive bolt.

7. The system of claim 6, wherein deformation of the another portion of the bolt shaft couples the head and the another portion of the bolt shaft to the another of the ring halves, after detonation of the explosive bolt.

8. The system of claim 1, wherein one or more parts of the clamp system are made of steel.

9. A Marman clamp comprising:
   a ring including two semicircular ring halves;
   a mechanical release separably mechanically coupling first ends of the ring halves; and
   a mechanical connection mechanically coupling together second ends of the ring halves, where the second ends are at opposite ends of the ring halves from the first ends;
   wherein the mechanical release includes a retainer pin at one of the first ends of the ring halves, where the retainer pin facilitates axially capturing separated portions of the mechanical release to the two of the parts, to aid in separating the ends of the two of the parts.

10. The clamp of claim 9, wherein the mechanical release includes an explosive bolt.

11. A method of disengaging a Marman clamp, the method comprising:
   detonating an explosive bolt of a mechanical release that couples together ends of clamp parts of the Marman clamp;
   retaining respective portions of the explosive bolt to the ends of the clamp parts after the detonation of the explosive bolt; and
   separating the ends of the clamp parts, with the portions of the explosive bolt retained to the ends of the clamp parts.

12. The method of claim 11, wherein the retaining includes using a retaining fastener to retain one of the portions of the explosive bolt to one of the ends of the clamp parts.

13. The method claim 11, wherein the retaining aids in using gases produced by the detonation in separating the ends.

* * * * *